US009862419B2

(12) United States Patent
Kido et al.

(10) Patent No.: US 9,862,419 B2
(45) Date of Patent: Jan. 9, 2018

(54) PROTECTIVE FRAME STRUCTURE

(71) Applicants:Aisin Keikinzoku Co., Ltd., Imizu-shi, Toyama (JP); Toyota Jidosha Kabushiki Kaisya, Toyota-shi, Aichi (JP)

(72) Inventors: Kosuke Kido, Toyama (JP); Hiroyuki Hatsumi, Toyama (JP); Satoshi Kawaguchi, Toyama (JP); Akihiro Kosaki, Aichi (JP); Koichi Tanaka, Aichi (JP); Takenori Kobayashi, Aichi (JP); Hisashi Tanaka, Aichi (JP)

(73) Assignee: Aisin Keikinzoku Co., Ltd. (JP)

( * ) Notice: Subject to any disclaimer, the term of this patent is extended or adjusted under 35 U.S.C. 154(b) by 0 days.

(21) Appl. No.: 15/493,882

(22) PCT Filed: Oct. 23, 2015

(86) PCT No.: PCT/JP2015/079924
§ 371 (c)(1),
(2) Date: Apr. 21, 2017

(87) PCT Pub. No.: WO2016/063967
PCT Pub. Date: Apr. 28, 2016

(65) Prior Publication Data
US 2017/0240207 A1 Aug. 24, 2017

(30) Foreign Application Priority Data

Oct. 24, 2014 (JP) ................................. 2014-216782

(51) Int. Cl.
*B60R 16/04* (2006.01)
*B62D 21/15* (2006.01)
(Continued)

(52) U.S. Cl.
CPC .............. *B62D 21/15* (2013.01); *B60R 16/04* (2013.01); *H01M 2/1083* (2013.01);
(Continued)

(58) Field of Classification Search
CPC ................................ B62D 21/15; B60R 16/04
See application file for complete search history.

(56) References Cited

U.S. PATENT DOCUMENTS

| 2009/0134667 A1* | 5/2009 | Tasumi | ................ B62D 21/157 296/193.07 |
| 2013/0026786 A1* | 1/2013 | Saeki | ....................... B60K 1/04 296/187.12 |
| 2015/0249240 A1* | 9/2015 | Hihara | ..................... B60K 1/04 180/68.5 |

FOREIGN PATENT DOCUMENTS

| JP | 2003-045392 A | 2/2003 |
| JP | 2005-050616 A | 2/2005 |

(Continued)

OTHER PUBLICATIONS

International Search Report for International Application No. PCT/JP2015/079924 dated Feb. 16, 2016 (2 pages).

*Primary Examiner* — John Walters
*Assistant Examiner* — James Triggs
(74) *Attorney, Agent, or Firm* — Harness, Dickey & Pierce, P.L.C.

(57) ABSTRACT

A protective frame structure includes: a lower frame; an intermediate frame that is interlinked with the lower frame and is situated above the lower frame; and an upper frame that is interlinked with the intermediate frame and is situated abobe the intermediate frame, wherein a mounting space in which a battery module is configured to be mounted is formed between the lower frame and the intermediate frame, an upper space is formed between the intermediate frame and the upper frame, and the intermediate frame is deformed
(Continued)

upward when an external load has been applied to the protective frame structure.

3 Claims, 3 Drawing Sheets

(51) Int. Cl.
*H01M 2/10* (2006.01)
*B60L 11/18* (2006.01)

(52) U.S. Cl.
CPC ........ *H01M 2/1094* (2013.01); *B60L 11/1877* (2013.01); *B60Y 2200/91* (2013.01); *B60Y 2200/92* (2013.01); *B60Y 2306/01* (2013.01); *H01M 2220/20* (2013.01); *Y10S 903/952* (2013.01)

(56) References Cited

FOREIGN PATENT DOCUMENTS

| | | |
|---|---|---|
| JP | 2007-125974 A | 5/2007 |
| JP | 2013-028191 A | 2/2013 |
| JP | 2013-089448 A | 5/2013 |
| JP | 2015-026488 A | 2/2015 |
| WO | WO-2014-061109 A1 | 4/2014 |

* cited by examiner

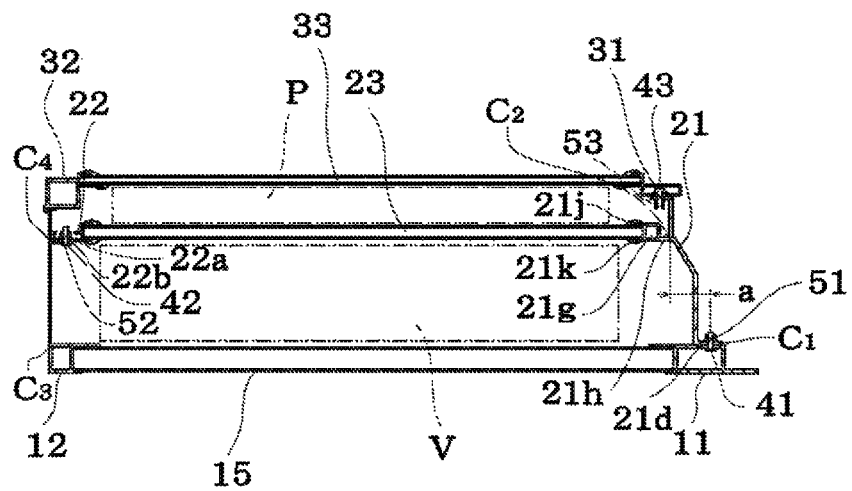
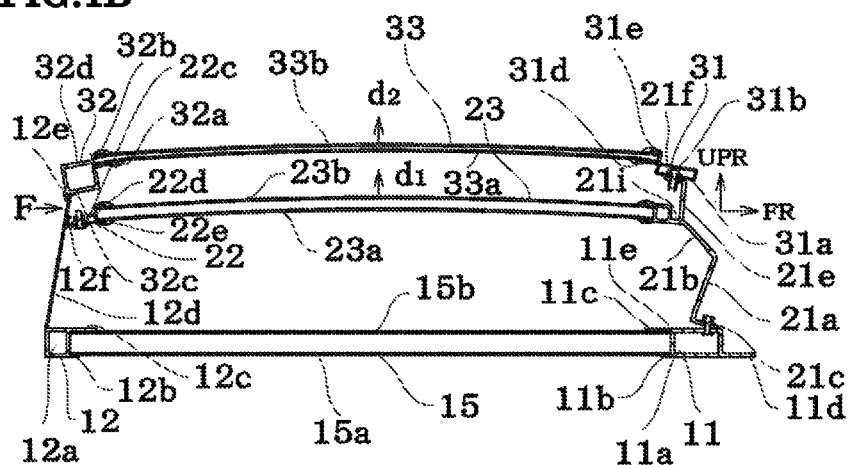

PROTECTIVE FRAME STRUCTURE

CROSS REFERENCE TO RELATED APPLICATION

This application is a continuation of International Patent Application No. PCT/JP2015/079924, having an international filing date of Oct. 23, 2015, which designated the United States, the entirety of which is incorporated herein by reference. Japanese Patent Application No. 2014-216782 filed on Oct. 24, 2014 is also incorporated herein by reference in its entirety.

BACKGROUND

The present invention relates to a protective frame structure that is used to mount a power supply such as a battery module on a vehicle, and protects the power supply from an external load when an external load has been applied to the vehicle.

In the fields of an electric vehicle and a hybrid vehicle, a battery referred to as "battery module" or "battery pack" (hereinafter referred to as "battery module") is provided as a drive source. Since the output voltage is as high as 200 V or more, it is necessary to protect the battery module from an impact and the like when an external load has been applied to the vehicle.

JP-A-2003-45392 discloses a mounting structure in which an impact-absorbing part is provided adjacent to a battery housing, the impact-absorbing part having a breaking strength lower than that of the battery housing.

Since the structure disclosed in JP-A-2003-45392 is designed so that the impact-absorbing part breaks when an impact has been applied to the rear side of the vehicle, and the battery housing relatively moves to overlap an area above or below the impact-absorbing part, the impact-absorbing part is a dead space that cannot be used by the user.

Since the mounting structure disclosed in JP-A-2003-45392 is designed so that the rear seats are situated on the front side with respect to the battery housing, it is necessary to provide an additional protective structure taking account of collision with the rear seats.

SUMMARY

An object of the invention is to provide a protective frame structure that can be effectively reduced in weight and size, and exhibits an excellent impact-absorbing capability.

According to one aspect of the invention, there is provided a protective frame structure comprising:

a lower frame;

an intermediate frame that is interlinked with the lower frame and is situated above the lower frame; and an upper frame that is interlinked with the intermediate frame and is situated above the intermediate frame, wherein a mounting space in which a battery module is configured to be mounted is formed between the lower frame and the intermediate frame, wherein an upper space is formed between the intermediate frame and the upper frame, and wherein the intermediate frame is deformed upward when an external load has been applied to the protective frame structure.

The positional relationship is described herein on the assumption that the lower frame is a member that is connected to (secured on) the vehicle, and the battery module is mounted (secured) on the lower frame.

According to the invention, the lower frame, the intermediate frame, and the upper frame are integrated to provide a given rigidity, and the intermediate frame is deformed upward (i.e., the direction in which the intermediate frame moves away from the battery module) to absorb the impact force.

This makes it possible to protect the battery module while reducing the weight of the entire protective frame structure and conserving space.

Although the following description is given on the assumption that the protection target is a battery module, the protective frame structure may be used to protect a part other than a battery module.

In the protective frame structure, wherein the lower frame may comprise a lower front frame and a lower rear frame that are configured to extend in a width direction with respect to a vehicle, and are configured to be situated opposite to each other in a forward-backward direction with respect to the vehicle, the lower front frame and the lower rear frame being connected through a lower connection frame, the intermediate frame may comprise an intermediate front frame and an intermediate rear frame that are configured to extend in the width direction, and are configured to be situated opposite to each other in the forward-backward direction, the intermediate front frame and the intermediate rear frame may be connected through an intermediate connection frame, the lower front frame and the intermediate front frame may be connected through a front-side vertical part that is provided to at least one of the lower front frame and the intermediate front frame, the lower rear frame and the intermediate rear frame may be connected through a rear-side vertical part that is provided to at least one of the lower rear frame and the intermediate rear frame, and a first base at which the front-side vertical part may be connected to the lower front frame is situated on a front side with respect to a second base at which the front-side vertical part is connected to the intermediate front frame.

The terms "front" and "rear" are used herein on the assumption that the battery module is provided to the rear part of a vehicle.

Therefore, an external load is mainly applied to the rear side of the vehicle. Note that the terms "front" and "rear" may be appropriately replaced by each other depending on the mounting position of the battery module with respect to the vehicle.

When the first base at which the front-side vertical part is connected to the lower front frame is situated on the front side (outer side) with respect to the second base at which the front-side vertical part is connected to the intermediate front frame, the external load from the rear side propagates to the front side through the intermediate connection frame, so that the front-side vertical part moves forward, and it serves as a trigger to let the intermediate connection frame deform upward.

In the protective frame structure, wherein:

the intermediate front frame may comprise an upper flange and a lower flange that make a pair;

an end of the intermediate connection frame may be inserted between the upper flange and the lower flange; and the intermediate front frame and the front-side vertical part may be connected at a position that is situated closer to the lower flange than the upper flange.

This prompts the center area of the intermediate connection frame to be deformed upward.

The upper frame may be deformed upward (outward) or downward (inward) from the viewpoint of protecting the battery module provided in the mounting space that is formed by the lower frame and the intermediate frame. When a device part such as a power supply control part is provided in the upper space that is formed between the intermediate frame and the upper frame, and it is desired to protect the device part, the upper frame may include an upper front frame and an upper rear frame that are configured to extend in the width direction, and are configured to be situated opposite to each other in the forward-backward direction, the upper front frame and the upper rear frame being connected through an upper connection frame, the upper front frame and the upper rear frame may include an upper flange and a lower flange that make a pair, each end of the upper connection frame may be inserted between the upper flange and the lower flange, and the lower flange may have a length greater than that of the upper flange, in order to prompt the upper frame to be deformed upward.

The protective frame structure according to the invention is configured so that the entire protective frame structure that includes the upper frame, the intermediate frame, and the lower frame supports the external load applied to the rear side, and the intermediate frame (particularly the center area of the intermediate connection frame) is deformed upward to absorb the impact force. This makes it possible to eliminate a dead space, differing from the case of providing the impact-absorbing part disclosed in JP-A-2003-45392 on the rear side of the battery housing, and implement a space-saving structure.

Since the intermediate frame is deformed upward to absorb an impact when the entire protective frame structure protects the battery module, the total weight of the protective frame structure can be reduced as compared with the case where the intermediate frame is not deformed.

BRIEF DESCRIPTION OF THE DRAWINGS

FIG. 1A is a cross-sectional view illustrating an example of the protective frame structure according to the invention, and FIG. 1B illustrates a deformation mode when an external load F has been applied.

FIGS. 2A to 2C illustrate the parts that are included in the protective frame structure according to the invention, wherein FIG. 2A is an external perspective view illustrating the upper frame, FIG. 2B is an external perspective view illustrating the intermediate frame, and FIG. 2C is an external perspective view illustrating the lower frame.

DESCRIPTION OF EXEMPLARY EMBODIMENTS

A configuration example of the protective frame structure according to the invention is described below with reference to the drawings. Note that the invention is not limited thereto.

Figure 2A:
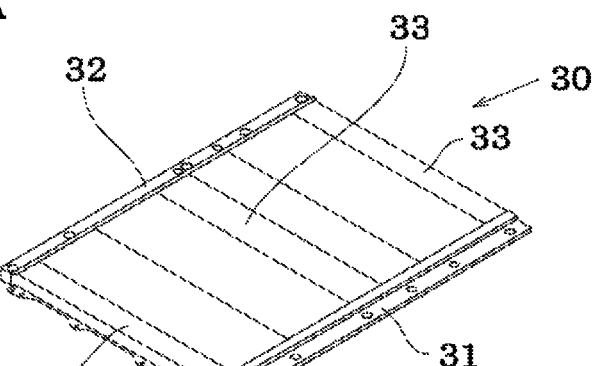
Figure 2B:
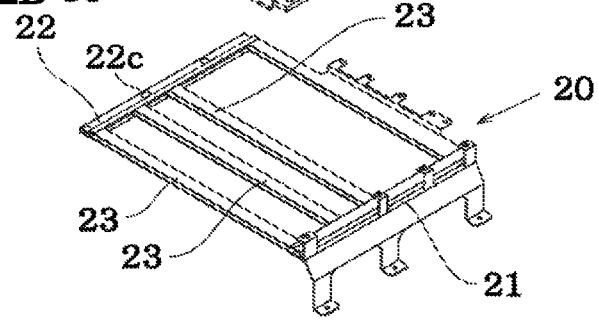
Figure 2C:
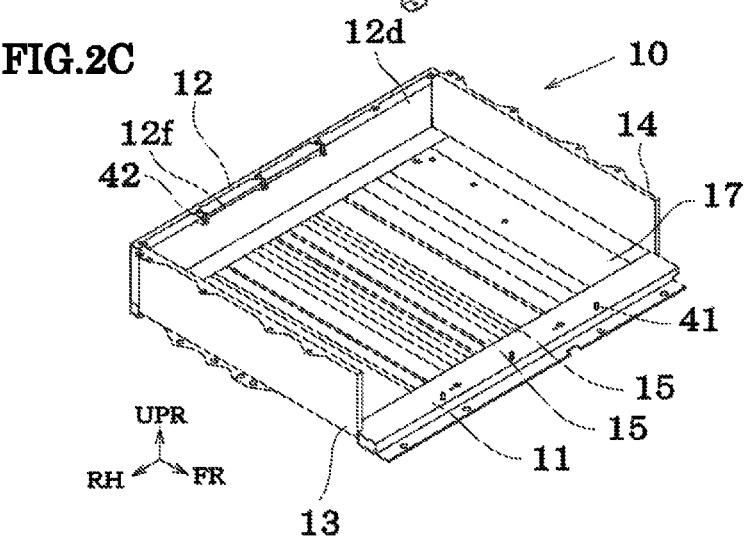

FIGS. 2A to 2C illustrate a configuration example of the members (parts) included in the protective frame structure according to the invention, and FIG. 1A is a cross-sectional view illustrating the protective frame structure according to the invention.

The protective frame structure includes a lower frame 10 that is secured on a vehicle body, an intermediate frame 20 that interlinked with the lower frame and is provided above the lower frame 10, and an upper frame 30 that interlinked with the intermediate frame and is provided above the intermediate frame 20.

As illustrated in FIG. 1A, the lower frame 10 and the intermediate frame 20 form a mounting space V in which a battery module or the like is configured to be mounted, and an upper space P is formed between the intermediate frame 20 and the upper frame 30.

A device part such as a power supply control part may optionally be provided in the upper space P.

The lower frame 10 includes a lower front frame 11 that has a hollow cross-sectional shape and is produced using an aluminum alloy extruded material or the like, and a lower rear frame 12 that has a hollow cross-sectional shape and is situated opposite to the lower front frame 11.

An example in which the battery module is provided on the rear side of the vehicle is described below. In this case, an external load F is applied from the rear side, and the protective frame structure is deformed due to the external load F (see FIG. 1B). Note that the terms "front" and "rear" may be replaced by each other depending on the mounting position of the battery module.

The lower front frame 11 and the lower rear frame 12 extend in the width direction with respect to the vehicle. The lower front frame 11 and the lower rear frame 12 are connected through a panel-shaped lower connection frame 15 that has a hollow cross-sectional shape (see FIG. 2C).

The lower connection frame 15 may be a single panel. In the example illustrated in FIG. 2C, the lower connection frame 15 is divided into a plurality of lower connection frames that optionally differ in shape.

The lower connection frame 15 is a hollow panel that has an upper side 15a and a lower side 15b.

In order to form a frame using the lower frame 10, the intermediate frame 20, and the upper frame 30, a lower side frame 13 and a lower side frame 14 are formed on either side of the lower frame 10 in the width direction with respect to the vehicle, and a panel-shaped rear-side vertical part 12d is integrally provided with the lower rear frame 12.

The lower front frame 11 is provided with an upper rib 11c and a lower rib 11b that extend internally (toward the rear side) from a base side 11d and an upper side 11e both of which form a hollow part 11a.

The lower rear frame 12 is provided with an upper rib 12c and a lower rib 12b that extend internally from the upper side and the lower side both of which form a hollow part 12a.

The ends of the lower connection frame 15 in the forward-backward direction are inserted into the space formed between the upper rib 11c and the lower rib 11b of the lower front frame 11, and the space formed between the upper rib 12c and the lower rib 12b of the lower rear frame 12, and welded or screwed in a state in which each end of the lower connection frame 15 comes in contact with the hollow part, for example.

The intermediate frame 20 has a structure in which an intermediate front frame 21 that has a hollow part 21g and is produced using an aluminum alloy extruded material or the like, and an intermediate rear frame 22 that has a hollow cross-sectional shape, are connected through an intermediate connection frame 23 that has a hollow cross-sectional shape.

The intermediate connection frame 23 is divided into a plurality of bars.

The intermediate front frame 21 has a structure in which a connection piece 21h extends from the lower side of the hollow part 21g toward the front side (outer side), and a front-side vertical part (21a,21b) is provided to the end of the connection piece 21h.

The front-side vertical part (21a, 21b) forms the mounting space V (in which the battery module is provided) together with the rear-side vertical part 12d. The vertical part (21a, 21b,12d) may be provided to either the lower frame 10 or the intermediate frame 20, or may be provided to both the lower frame 10 and the intermediate frame 20, and connected.

In the example illustrated in the drawings, the rear-side vertical part 12d is integrally provided to the lower rear frame 12, and the front-side vertical part (21a, 21b) is provided to (suspended from) the intermediate front frame 21 included in the intermediate frame 20.

The front-side vertical part (21a,21b) includes a vertical part 21a that extends almost vertically, and a slope part 21b that slopes toward the rear side. The lower end of the front-side vertical part (21a,21b) is bent to form a connection part 21c, and the front-side vertical part is fastened to the lower front frame 11 through a hole 21d formed in the connection part 21c using a screw 41 and a nut 51.

The intermediate rear frame 22 included in the intermediate frame 20 is fastened to a connection piece 12f provided to the rear-side vertical part 12d through an inlet 22c and a hole 22b that receive a nut 52 using a screw 42 and the nut 52.

Figure 4:
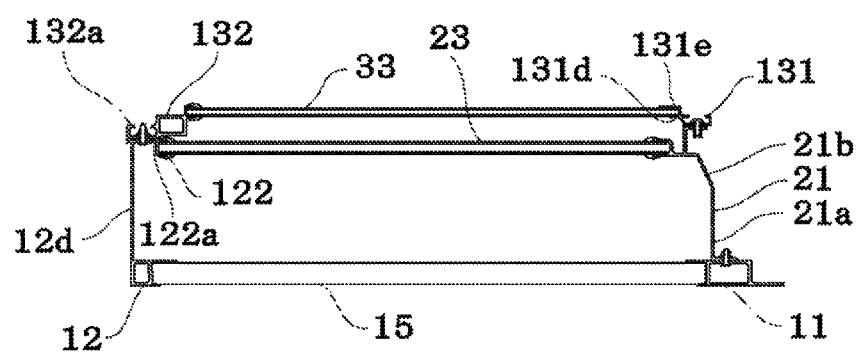
FIG. 4 illustrates an example in which the intermediate rear frame and the upper rear frame are fastened to the vertical part provided to the lower rear frame.

As illustrated in FIG. 4, an intermediate rear frame 122 may be fastened to the vertical part 12d provided to the lower rear frame 12 so that a connection part 122a provided to the intermediate rear frame 122 and a connection part 132a provided to an upper rear frame 132 overlap each other. An arbitrary connection structure may be employed.

The ends of the intermediate connection frame 23 having a hollow cross-sectional shape are inserted into the space formed between an upper flange 21j and a lower flange 21k provided to the intermediate front frame 20 and the space formed between an upper flange 22d and a lower flange 22e provided to the intermediate rear frame 20, and welded, for example.

The intermediate connection frame 23 is welded so that a lower side 23a and an upper side 23b of the intermediate connection frame 23 come in contact with the inner side of the lower flange 21k and the inner side of the upper flange 21j, and the end face of the intermediate connection frame 23 comes in contact with the hollow part 21g.

Since the hollow part 21g of the intermediate front frame 23 and the upper end of the slope part 21b of the front-side vertical part are connected through the connection piece 21h, a recess 21i is formed on the upper side of the connection piece 21h.

Figure 3:
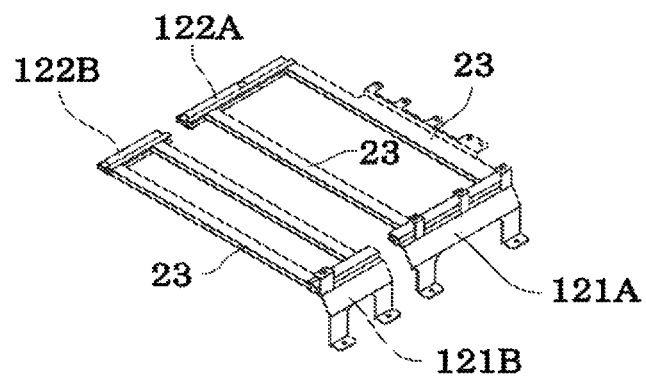
FIG. 3 illustrates an example in which the intermediate frame is divided.

As illustrated in FIG. 3, the intermediate frame may be divided into a plurality of frames such as intermediate front frames 121A and 121B and intermediate rear frames 122A and 122B.

The upper frame 30 is used to form the upper space P between the upper frame 30 and the intermediate frame 20.

The upper frame 30 has a structure in which an upper front frame 31 that has a hollow cross-sectional shape and is produced using an aluminum alloy extruded material or the like, and an upper rear frame 32 that has a hollow cross-sectional shape, are connected through an upper connection frame 33 that is formed in the shape of a panel having a hollow cross-sectional shape.

The upper frame 30 functions as a lid.

An upper flange 31e and a lower flange 31d are formed from an upper side 31b of a hollow part 31a of the upper front frame 31 so as to extend internally (toward the rear side). The length of the lower flange 31d is greater than that of the upper flange 31e.

As illustrated in FIG. 4, an upper front frame 131 in which the length of an upper flange 131e is greater than that of a lower flange 131d may be used depending on the deformation mode of the upper frame.

The upper rear frame 32 has a structure in which an upper flange 32b and a lower flange 32a are formed from an upper side 32d of a hollow part so as to extend internally (toward the front side). The length of the lower flange 32a is greater than that of the upper flange 32b.

The ends of the upper connection frame 33 (that is formed in the shape of a panel having a hollow cross-sectional shape) in the forward-backward direction are inserted into the space formed between the upper flange 31e and the lower flange 31d, and the space formed between the upper flange 32b and the lower flange 32a, so that an upper side 33b and a lower side 33a come in contact therewith, and are welded, for example.

The upper front frame 31 is fastened to an upper end 21f of a mounting piece 21e provided to the intermediate front frame 21 included in the intermediate frame 20 through a working hole formed in the upper side of the hollow part and a hole 31f formed in the lower side of the hollow part using a screw 43 and a nut 53.

The upper rear frame 32 is connected so that a lower side 32c of the hollow part is situated on an upper end 12e of the rear-side vertical part 12d.

The deformation mode due to the external load F is described below with reference to FIG. 1B.

The lower frame 10 is provided (connected) so that the hollow part 11a of the lower front frame 11 and the hollow part 12a of the lower rear frame 12 come in contact with each end face of the lower connection frame 15 having a hollow cross-sectional shape.

The intermediate frame 20 is provided (connected) so that the hollow part 21g of the intermediate front frame 21 and the hollow part of the intermediate rear frame 22 come in contact with each end face of the intermediate connection frame 23 having a hollow cross-sectional shape, and the slope part 21b of the front-side vertical part and the rear-side vertical part 12d are connected along the extension line of the lower flange 21k and the extension line of the lower flange 22e.

The upper frame 30 is provided so that the upper part of the hollow part of the upper front frame 31 and the upper part of the hollow part of the upper rear frame 32 are connected through the upper connection frame 33 having a hollow cross-sectional shape, the length of the lower flange 31d is greater than that of the upper flange 31e, and the length of the lower flange 32a is greater than that of the upper flange 32b.

When the external load F is applied to the rear side of the protective frame structure, the impact load propagates over the entirety of the lower frame 10, the intermediate frame 20, and the upper frame 30.

In this case, the mounting space V (in which the battery module is provided) is deformed from connection bases C1 to C4 illustrated in FIG. 1A as a starting point.

Since the front-side vertical part provided to the intermediate front frame 21 includes the vertical part 21a and the slope part 21b, and the connection base C1 between the intermediate front frame 21 and the lower front frame 11 is situated on the front side with respect to the connection base C2 provided to the intermediate connection frame 23, deformation occurs so that the connection base C2 moves diagonally downward. The deformation serves as a trigger to let the intermediate connection frame 23 deform upward.

Since the ends of the intermediate connection frame 23 are connected to the front-side vertical part and the rear-side vertical part on the side of the lower flange 21k and the lower flange 22e, and the recess 21i is formed on the front side, the center area of the intermediate connection frame 23 is deformed in a direction dl (upward direction).

The mounting space V (in which the battery module is provided) is thus maintained (i.e., the battery module is protected).

Since the length of the lower flange 31d is greater than that of the upper flange 31e, and the length of the lower flange 32a is greater than that of the upper flange 32b (the ends of the upper connection frame 33 included in the upper frame 30 being inserted into the space formed between the upper flange 31e and the lower flange 31d and the space formed between the upper flange 32b and the lower flange 32a), the upper connection frame 33 is easily deformed in a direction d2 (upward direction). On the other hand, when a load is applied in the downward direction, the deformation load increases since the load is supported by the lower flange, the hollow part of the upper front frame 31, and the hollow part of the upper rear frame 32.

A device part that may be provided in the upper space P is thus protected.

The protective frame structure according to the invention may be used as a protective structure that protects various parts provided to a vehicle.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A protective frame structure comprising:
   a lower frame;
   an intermediate frame that is interlinked with the lower frame and is situated above the lower frame; and
   an upper frame that is interlinked with the intermediate frame and is situated above the intermediate frame,
   wherein a mounting space in which a battery module is configured to be mounted is formed between the lower frame and the intermediate frame,
   wherein an upper space is formed between the intermediate frame and the upper frame, and
   wherein the intermediate frame is deformed upward when an external load has been applied to the protective frame structure.

2. The protective frame structure as defined in claim 1,
   wherein the lower frame comprises a lower front frame and a lower rear frame that are configured to extend in a width direction with respect to a vehicle, and are configured to be situated opposite to each other in a forward-backward direction with respect to the vehicle, the lower front frame and the lower rear frame being connected through a lower connection frame,
   wherein the intermediate frame includes an intermediate front frame and an intermediate rear frame that are configured to extend in the width direction, and are configured to be situated opposite to each other in the forward-backward direction, the intermediate front frame and the intermediate rear frame being connected through an intermediate connection frame,
   wherein the lower front frame and the intermediate front frame are connected through a front-side vertical part that is provided to at least one of the lower front frame and the intermediate front frame,
   wherein the lower rear frame and the intermediate rear frame are connected through a rear-side vertical part that is provided to at least one of the lower rear frame and the intermediate rear frame, and
   wherein a first base at which the front-side vertical part is connected to the lower front frame is situated on a front side with respect to a second base at which the front-side vertical part is connected to the intermediate front frame.

3. The protective frame structure as defined in claim 2, wherein:
   the intermediate front frame comprises an upper flange and a lower flange that make a pair;
   an end of the intermediate connection frame is inserted between the upper flange and the lower flange; and
   the intermediate front frame and the front-side vertical part are connected at a position that is situated closer to the lower flange than the upper flange.

* * * * *